United States Patent [19]

Barteck

[11] Patent Number: 4,915,395
[45] Date of Patent: Apr. 10, 1990

[54] SEAL CONSTRUCTION FOR A MOLD STRUCTURE FOR ENCAPSULATING GLASS WITH A GASKET

[75] Inventor: Werner W. Barteck, La Salle, Mich.

[73] Assignee: Libbey-Owens-Ford Co., Toledo, Ohio

[21] Appl. No.: 364,796

[22] Filed: Jun. 9, 1989

Related U.S. Application Data

[62] Division of Ser. No. 88,123, Aug. 21, 1987, Pat. No. 4,854,599.

[51] Int. Cl.$^4$ .................. B29C 39/18; B29C 39/28
[52] U.S. Cl. ........................... 277/12; 249/95; 264/252; 264/255; 277/188 R; 277/194; 425/116
[58] Field of Search ............... 277/12, 165, 188 R, 277/194, 228; 249/85, 95; 425/116, 129.1; 264/252, 255, DIG. 70

[56] References Cited

U.S. PATENT DOCUMENTS

| | | | |
|---|---|---|---|
| 2,905,489 | 9/1959 | Thompson et al. | 277/165 |
| 4,044,984 | 8/1977 | Shimizu et al. | 425/116 X |
| 4,561,625 | 12/1985 | Weaver | 425/116 X |
| 4,688,752 | 8/1987 | Barteck et al. | 249/85 |
| 4,732,553 | 3/1988 | Hofer | 425/116 X |
| 4,826,417 | 5/1989 | Reilly et al. | 249/85 |

FOREIGN PATENT DOCUMENTS 217406 4/1958 Australia ..................... 277/165

Primary Examiner—Allan N. Shoap
Assistant Examiner—Scott Cummings
Attorney, Agent, or Firm—Marshall & Melhorn

[57] ABSTRACT

A unique dynamic seal assembly is used in a mold structure for encapsulating a glass window assembly with a gasket. The seal assembly resiliently supports the window assembly and cooperates with the mold structure for defining a gasket forming cavity. The mold structure typically includes two cooperating mold sections, each of which can be provided with a groove for receiving a separate dynamic seal assembly. Each seal assembly includes a first sealing body having a sealing surface which faces and is adapted to sealingly contact the window assembly. The first seal element is formed of a non-deformable, non-compressible material and is connected to a second seal element formed of a deformable, non-compressible material which is responsive to pressure applied to the first seal element for adjusting the position of the first seal element in the mold to accommodate thickness variations in a window assembly contacting the first surface. The first seal element is typically formed of a Teflon material and is movable in a vertical direction to accommodate thickness variations in a window assembly contacting the first sealing surface. The second seal element is formed of a silicon rubber material or is a tube filled with a non-compressible fluid.

10 Claims, 3 Drawing Sheets

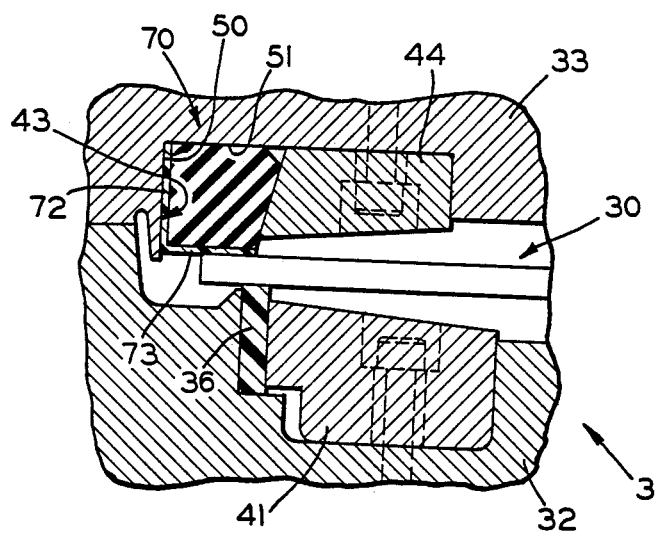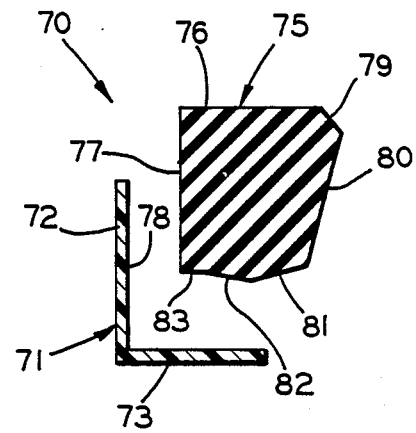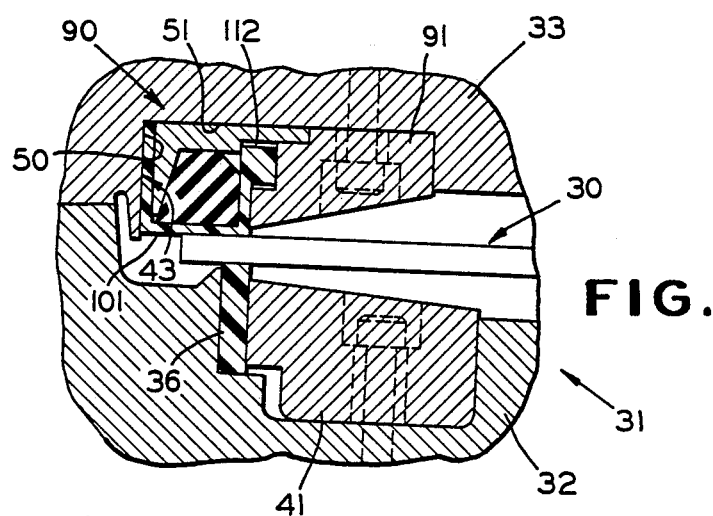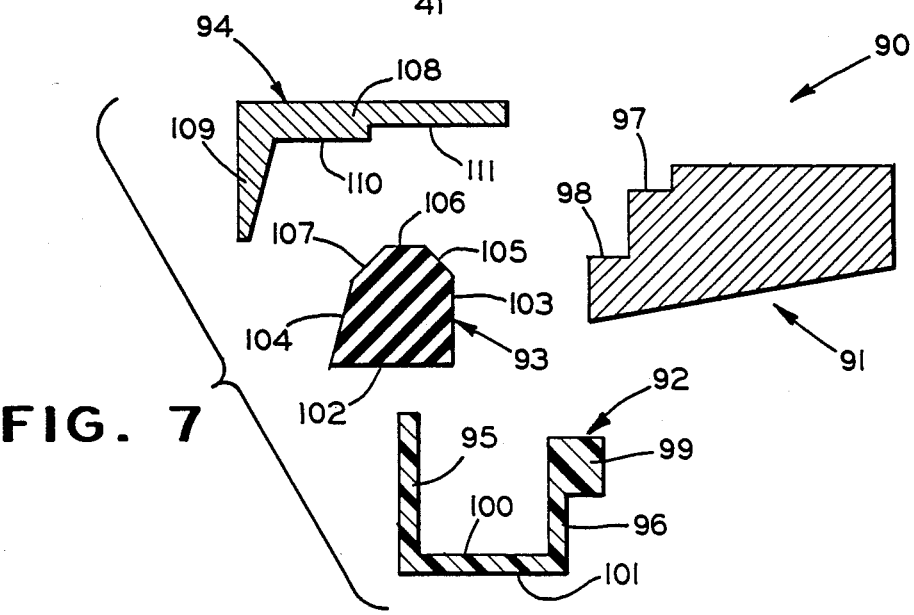

SEAL CONSTRUCTION FOR A MOLD STRUCTURE FOR ENCAPSULATING GLASS WITH A GASKET

This is a division of application Ser. No. 07/088,123 filed Aug. 21, 1987, now U.S. Pat. No. 4,854,599 issued Aug. 8, 1989.

BACKGROUND OF THE INVENTION

The present invention relates to a seal assembly for use in an injection molding process and; more particularly, to a seal assembly for use in a mold for making encapsulated window structures.

Initially, fixed window assemblies for vehicles were comprised of a plurality of elements including adhesive sealants applied around the marginal edges of a glass sheet, suitable mechanical fasteners such as metal clips, and exterior decorative trim strips disposed to cover the junction between the marginal edges of the glass sheet and the adjacent portions of the vehicle frame. Such window structures were costly, especially from a labor standpoint, since it was necessary to assemble the individual elements along the vehicle assembly line.

Subsequently, in an endeavor to improve the above window structure, unitary window assemblies of the type illustrated in U.S. Pat. No. 4,072,340 were developed. These window assemblies included a sheet of glass, an adjacent frame, and a casing or gasket of molded material, such as polyvinylchloride, extending between the frame and the peripheral edge of the window to hold the sheet of glass and the frame together. Fasteners were provided at spaced locations along the frame such that the entire assembly could be guided into a location over the opening in a vehicle body as a unit. Other types of unitary window assemblies are disclosed in U. S. Pat. Nos. 3,759,004 and 4,364,595. While such unitary window structures greatly reduce the time required to mount the window assembly in an associated vehicle, such structures are relatively costly, since the individual components required to produce each window assembly generally must be manually assembled.

Recently, window assemblies have been formed by encapsulating at least a portion of the periphery of a sheet of glass with a gasket material. Typically, the gasket is formed by curing a polymeric gasket-forming material in situ on the glass sheet to encapsulate a predetermined portion of the marginal edge of the sheet. The gasket can be polyurethane and formed, for example, by a reaction injection molding process.

A mold structure which can be utilized to encapsulate a glass sheet with an integrally molded gasket is disclosed in U.S. Pat. No. 4,561,625 issued to W. R. Weaver and assigned to the assignee of the present invention. In this patent, the mold structure includes at least two mold sections having facing surfaces cooperating to define a chamber for receiving a glass sheet. A resilient seal means is positioned in at least one of the mold sections about at least a portion of the periphery of the chamber and functions to resiliently support the glass sheet within the chamber. Each mold section includes a metallic main body portion, and the seal means maintains at least the portion of the glass sheet located inwardly of the seal means in spaced-apart relationship with the metallic main body portions of the mold sections.

Also, in the Weaver patent, the seal means cooperates with predetermined portions of the glass sheet and the mold sections for defining a gasket forming cavity having a configuration corresponding to the gasket to be formed on the glass sheet. At least a portion of the facing surfaces of the mold sections disposed outwardly of the gasket forming cavity are in metal-to-metal contact with one another. This enables the amount the seal means is compressed and the dimensions of the gasket to be controlled.

The prior art seals are typically deformable, static silicone rubber or Teflon coated elastomeric seals. In order to accommodate differences in contour or edge profile which occur between individual glass sheets, these seals must be deformed sufficiently to fill "low spots" and prevent gaps between the glass and the seal which would cause excessive flash formation on the gasket being molded. This deformation causes very high pressure on the high spots, resulting in seal fatigue and leading to premature seal failure. In some instances, the excessive pressure may cause breakage of the glass sheet. In all cases excess pressure distorts the seal contour resulting in distorted molded gasket shapes.

SUMMARY OF THE INVENTION

The present invention relates to a unique seal assembly for a mold structure for molding a gasket in situ around the periphery of a glass window assembly. The seal assembly is adapted to resiliently support the window assembly within the mold structure and cooperates with the mold structure for defining a gasket forming cavity. One seal structure of the present invention is dynamic and includes a deformable seal element which automatically compensates for pressure differentials caused by low and high spots in the sheet of glass. With the present invention, excessive pressure generated at a high spot on the glass is transferred to an adjacent low spot to equalize the pressure along the whole length of the seal.

More specifically, the mold structure typically includes two cooperating mold sections, each of which can be provided with a groove for receiving a separate dynamic seal assembly. Each seal assembly can be of the dynamic type or one of the seal assemblies can be a static type. The dynamic type seal includes a first seal element formed of a non-deformable, non-compressible material having a first surface adapted to sealingly contact a window assembly. The seal assembly also includes a second seal element formed of deformable, non-compressible material and connected to the first seal element and responsive to pressure applied to the first seal element for adjusting the position of the first seal element in a mold to accommodate thickness variations in a window assembly contacting the first surface.

In one embodiment, the second seal element is formed of a rubber material having a durometer hardness of approximately seventy. In another embodiment, the second seal element is a fluid filled bladder positioned between the first seal element and the cooperating mold section. In either case, when increased pressure is applied to a local area of the seal as a result of a contour difference between the seal and the window assembly, the second seal element deforms to automatically transfer at least a portion of the applied pressure to adjacent areas of the seal. Such a seal construction produces a more effective seal and reduces seal fatigue, thereby increasing the life of the seal, and assures molding an undistorted, true to design, molded gasket. The first seal element can be formed of a non-deformable, non-compressible material such as a Teflon material having a durometer hardness of approximately ninety.

It is accordingly an object of the invention to produce an encapsulation seal useful in the production of flash-free plastic material encapsulated products. The resultant seal structure may be satisfactorily utilized in the production of encapsulated glass sheet products to provide the desired flash-free product without subjecting the glass assembly to excessive stresses which might otherwise cause breakage of the glass.

BRIEF DESCRIPTION OF THE DRAWINGS

The above, as well as other advantages of the present invention, will become readily apparent to those skilled in the art from the following detailed description of the preferred embodiments when considered in the light of the accompanying drawings, in which:

FIG. 4 is a fragmentary sectional view of an alternate embodiment of the seal assembly shown in FIG. 3;

FIG. 5 is an enlarged, exploded view of the upper seal body shown in FIG. 4;

FIG. 6 is a fragmentary sectional view of a second alternate embodiment of the seal assembly shown in FIG. 3;

FIG. 7 is an enlarged, exploded view of the upper seal body shown in FIG. 6;

DESCRIPTION OF THE PREFERRED EMBODIMENT

Figure 1:
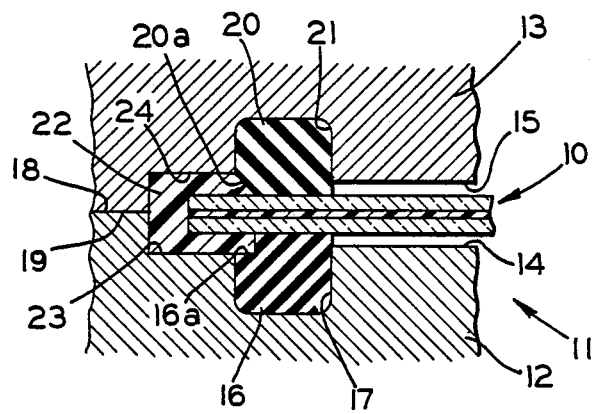
FIG. 1 is a fragmentary sectional view of a prior art window assembly and mold structure.

There is shown in FIG. 1 a window assembly 10 positioned within a mold structure 11 utilizing a seal according to a prior art mold structure of the type disclosed in above-mentioned U.S. Pat. No. 4,561,625, which is herein incorporated by reference. The mold structure 11 includes a lower section 12 and an upper section 13 which are coupled to suitable means (not shown) for opening and closing the mold sections 12 and 13. The mold structures 12 and 13 are typically formed of a rigid material such as, for example, steel or aluminum. Also, each of the mold sections 12 and 13 can be provided with passageways (not shown) for circulating a suitable coolant or heating fluid through the The mold sections 12 and 13 are provided with recessed portions 14 and 15 respectively in facing relationship to one another such that, when the mold sections are closed, the recessed portions 14 and 15 cooperate to define a sheet receiving or glass clearance chamber for receiving the window assembly 10 on which a gasket is to be formed. When the mold sections are open, the window assembly 10 is positioned on the lower section 12 so that the outer peripheral portion of the lower surface of the glass rests on a resilient lower seal 16 positioned within a groove 17 formed in the upper surface of the lower section 12. After the window assembly 10 is suitably positioned on the seal 16 of the lower mold section 12, the upper mold section 13 is lowered into position to enable the outer peripheral portions of the facing surfaces 18 and 19 of the cooperating mold sections 12 and 13 respectively to be clamped in metal-to-metal contact, as shown in FIG. 1. The upper mold section 13 carries a resilient upper seal 20 positioned in a groove 21 formed opposite the groove 17. The upper seal 20 cooperates with the lower seal 16 to press yieldingly against the glass sheet window assembly 10 and resiliently support the window assembly within the glass clearance chamber.

The chamber or space between the surfaces of the recessed portions 14 and 15 is slightly larger than the thickness of the window assembly 10. However, it will be appreciated that the glass clearance chamber can be formed of any shape as long as the chamber is sufficiently large to avoid any glass-to-metal contact between the glass sheets of the window assembly 10 and the metallic mold sections 12 and 13. For example, the portions of the mold sections 12 and 13 which are below and above respectively the central portion of the glass sheet window assembly 10 can be removed such that each mold section will be generally ring-shaped. The seals 16 and 20 are preferably formed of a silicone rubber material and secured within the respective grooves 17 and 21 by means of a suitable adhesive.

In addition to resiliently supporting the window assembly 10 within the glass clearance chamber, the seals 16 and 20 cooperate with selected portions of the window assembly 10 and the mold sections 12 and 13 for defining a gasket forming cavity utilized to form a gasket 22 about the peripheral edge of the window assembly 10. More specifically, in FIG. 1, the gasket forming cavity is defined by the cooperation of a lower gasket shaping surface 23 of the lower mold section 12, an upper gasket shaping surface 24 of the upper mold section 13, portions 16a and 20a of the seals 16 and 20 respectively, and the peripheral edge portion of the window assembly 10. The gasket forming cavity can be constructed to form the gasket 22 on either the entire periphery of the window assembly 10, or on a selected peripheral portion. Once the mold sections are closed, a flowable polymeric gasket forming material can be injected into the cavity through suitable inlet means (not shown).

Figure 2:
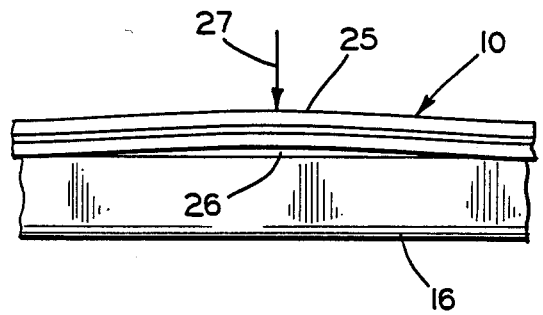
FIG. 2 is a fragmentary elevational view of the prior art window assembly and seal of FIG. 1.

Referring to FIG. 2, there is show an elevational view of a portion of the window assembly 10 and the lower seal 16. While the seal 16 ideally constructed with a contour which conforms to the contour of the edge of the window assembly 10, due to the normal glass forming and bending operations, the window assembly often has a contour which is slightly different from the contour of the seal 16. In FIG. 2, there is shown at 25 a difference in contour between a peripheral edge portion of the window assembly 10 and an upwardly facing portion of the seal 16. The lower surface of the window assembly 10 in the area 25 is spaced upwardly from the seal 16 when the window assembly is placed in the upper surface of the seal 16. The contour difference 25 forms a space or gap 26 which, prior to the injection of the gasket forming material, must be sealed in order to prevent leakage of the gasket forming material past the seal 16, thereby producing undesirable flash on the finished gasket.

When the upper mold section is placed on the top of the window assembly 10, pressure is applied in the direction of the arrow 27. The gasket 16 will tend to deform by compressing in the regions on either side of the gap 26 and, if enough pressure is applied, the region of the gasket 16 adjacent the contour difference area 25 will contact the facing surface of the window assembly 10 to eliminate the gap 26. However, when such contact occurs, relatively little pressure is applied to the seal 16 by the area 25 of the window assembly 10, thereby increasing the possibility of a blowout which will allow leakage of the gasket forming material and prevent fill-out resulting in an incomplete gasket. In addition, the regions of the seal 16 on either side of the gap 26 are subjected to increased pressure which causes increased seal fatigue and results in premature seal failure. Further, if the increased pressure is excessive, breakage of the window assembly can occur.

Figure 3:
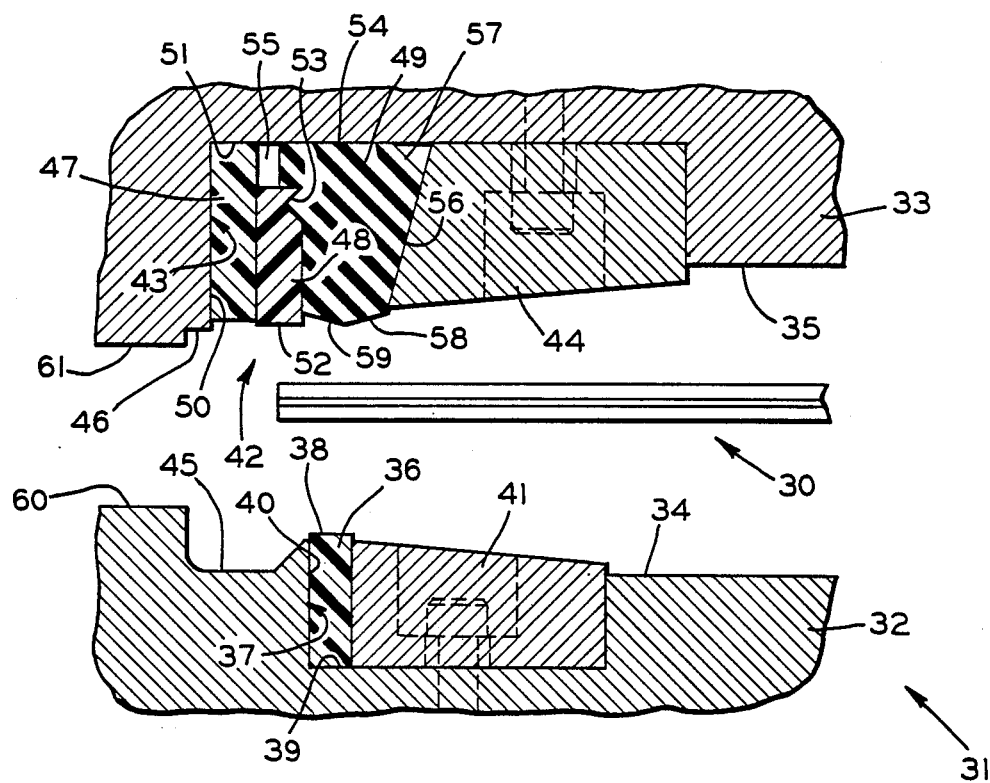
FIG. 3 is a fragmentary sectional view of a window assembly and mold structure incorporating a seal assembly in accordance with the present invention.

There is shown in FIG. 3 a seal assembly according to the present invention. A window assembly 30, similar to the window assembly 10, is positioned in a mold 31 having a lower section 32 and an upper section 33. The mold sections 32 and 33 are typically formed of a metallic material and have recessed portions 34 and 35 respectively to form a chamber for receiving the window assembly 30 and preventing glass-to-metal contact between the window assembly and the mold sections. A stationary lower seal body 36, constructed of a non-deformable, non-compressible material such as Teflon material having a ninety durometer hardness, is positioned in a groove 37 and has a sealing surface 38 which engages a lower surface of the window assembly 30 to support the window assembly above the lower section 32. The groove 37 has an upwardly facing bottom wall 39 upon which the seal 36 rests and a side wall 40 against which the seal 36 is retained by a clamp 41. The clamp 41 can be retained in the groove 37 by any suitable fastener means.

An upper seal body 42 is constructed of three sections and is located in a groove 43 formed in the upper section 33 and has a sealing surface which engages the window assembly 30. The upper seal 42 is retained in the groove 43 by a clamp 44 which in turn can be retained in the groove 43 by any suitable fastener means. The lower section 32 and the upper section 33 have a lower cavity 45 and an upper cavity 46 respectively formed therein for forming a gasket which is similar to the gasket 24 in FIG. 1.

The upper seal body 42 includes an outer section 47, a center section 48, and an inner section 49. The outer section 47 and the center section 48 can be formed of a non-deformable, non-compressible material such as Teflon material having a ninety durometer hardness. The inner section 49 can be formed of a deformable, non-compressible material such as silicone rubber having a seventy durometer hardness. The outer section 47 is similar in shape to the lower seal body 36 and abuts a side wall 50 of the groove 43 formed in the upper mold section 33. The outer section 47 also rests against a bottom wall 51 of the groove 43 and is of such a length that it does not extend out of the groove 43 and into the upper cavity 46.

The center section 48 includes a sealing surface 52 which engages an upper surface of the window assembly 30. A V-shaped groove 53 is formed in a side wall of the center section 48 abutting the inner section 49 and adjacent the end of the center section 48 opposite the sealing surface 52. The center section 48 is spaced from the bottom wall 51 of the groove 43 and the sealing surface 52 extends beyond the adjacent end of the outer section 47.

One end of the inner section 49 is formed with a generally planar surface 54 which abuts the bottom wall 51 of the groove 43. A side wall of the inner section 49 abutting the center section 48 extends into the groove 53 and partially covers the end of the center section 48 adjacent the groove 53 leaving a gap 55 between the outer section 47 and the inner section 49. The opposite side wall of the inner section 49 includes a first planar surface 56 abutting a surface of the clamp 44. A second planar surface 57 of the side wall extends from the planar surface 54 to an intersection with an edge of the planar surface 56. The surfaces 56 and 57 are formed at an angle with respect to the vertical such that the side wall defined by these surfaces extends outwardly. The inner section 49 also has an outwardly extending sealing surface end defined by a pair of planar surfaces 58 and 59. The planar surface 58 intersects the planar surface 56 along one edge and intersects the planar surface 59 along an opposite edge. The planar surface 59 intersects the side wall of the inner section 49 which abuts the center section 48.

When the lower mold section 32 and the upper mold section 33 are closed together such that a facing surface 60 of the lower section 32 contacts a facing surface 61 of the upper section 33, the sealing surface 38 of the lower seal body 36 will contact the lower surface of the window assembly 30. The lower seal body 36 will prevent gasket forming material in the lower cavity 45 from entering the groove 37 and the recessed portion 34 of the lower mold section 32 thereby preventing the formation of flash.

At the same time, the sealing surface 52 of the center section 48 will contact the upper surface of the window assembly 30 to prevent gasket forming material in the upper cavity 46 from entering the groove 43 and the recessed portion 35 of the upper mold section 33. However, since the thickness of the window assembly 30 will vary from unit to unit, the center section 48 will accommodate such variations in a generally vertical direction by sliding against the outer section 47 while deforming the inner section 49 as required. The section 47 also provides a glass contacting surface to accommodate misaligned or oversized sheets. The length of sheets can vary due to variations in curvature from one sheet to another. Thus, the lower seal body 36 functions as a static seal while the upper seal body 42 functions as a dynamic seal. In some applications, it may be desirable to eliminate the outer section 47 such as where the upper seal body 42 will abut an insert to be molded into the gasket. Also, the outer section 47 could be utilized between the lower seal body 36 and the side wall 40 in the lower mold section 32 as a spacer.

An alternate embodiment of the seal assembly in accordance with the present invention is shown in FIG. 4. Like reference numerals designate similar elements. The window assembly 30 is positioned in the mold 31 wherein the lower mold section 32 and the upper mold section 33 have been closed together. A peripheral portion of the lower surface of the window assembly 30 rests on the lower seal body 36 which is positioned in the lower mold section 32 by the clamp 41. Similarly, an upper seal body 70 is retained in the upper mold section 33 by the clamp 44. The lower seal body 36 is formed of a non-deformable, non-compressible material such as a Teflon material and functions as a static seal. The upper seal body 70 is of two piece construction and functions as a dynamic seal.

The seal 70 is shown in more detail in an enlarged, exploded view FIG. 5. An outer section 71 includes a generally vertically extending leg 72 connected at a lower end thereof to a right end of a generally horizontally extending leg 73, the legs extending generally at right angles to one another. The leg 72 is adapted to abut the side wall 50 of the groove 43 formed in the upper mold section 33. The leg 73 is adapted to contact the upper surface of the window assembly 30. Thus, a downwardly facing surface 74 of the leg 73 functions as the sealing surface 52 of the upper seal body 42 shown in FIG. 3. Typically, the outer section 71 is formed of Teflon material and the legs 72 and 73 are of a thickness, typically 0.060 inches, which permits some degree of flexing.

The upper seal body 70 also includes an inner section 75 which is similar to the inner section 49 shown in FIG. 3. The inner section 75 includes an upwardly facing generally horizontally extending planar surface 76 which is adapted to abut the bottom wall 51 of the groove 43. A generally vertically extending planar side wall 77 intersects one edge of the planar surface 76. The side wall 77 is adapted to abut an inner planar surface 78 of the leg 72 formed on the outer section 71. Opposite the side wall 77 is a generally outwardly extending side wall formed of planar surfaces 79 and 80. The planar surface 79 extends between adjacent edges of the planar surface 76 and the planar surface 80. The planar surface 80 is generally parallel to and abuts a facing surface of the clamp 44.

The downwardly facing side of the inner section 75 is formed from three planar surfaces 81, 82 and 83. The surface 81 extends between opposed edges of planar surface 80 and planar surface 82. The planar surfaces 81 and 82 are angled downwardly to form a generally outwardly extending surface. The planar surface 83 extends generally horizontally between opposed edges of the side wall 77 and the planar surface 82. The inner section 75 can be formed of a silicone rubber material having a seventy durometer hardness. Thus, the inner section 75 is deformable and non-compressible. When the mold sections 32 and 33 are moved together, the inner section 75 permits the leg 73 of the outer section 71 to flex thereby accommodating any variations in the thickness of the window assembly 30.

There is shown in FIG. 6 a second alternate embodiment of the seal assembly in accordance with the present invention. As in FIG. 4, like reference numerals are utilized to designate like elements from FIG. 3. An upper seal body 90 is retained in the groove 43 formed in the upper mold section 33 by a clamp 91. The upper seal body 90 and the clamp 91 are shown in more detail in an enlarged, exploded view FIG. 7. The upper seal body 90 includes an outer section 92, an inner section 93, and a cover section 94. The outer section 92 is generally U-shaped having a first vertically extending leg 95 adapted to abut the side wall 50 of the groove 43 and a second generally vertically extending leg 96 adapted to abut the clamp 91. The clamp 91 has a pair of steps 97 and 98 formed on the surface facing the leg 96. The lower step 98 accepts a flange 99 formed on the upper end of the leg 96 and extending toward the clamp 91. The step 98 limits the downward movement of the leg 96. The bottom ends of the legs 95 and 96 are joined by a generally horizontally extending member 100 having a downwardly facing sealing surface 101 formed thereon for contacting the upwardly facing surface of the window assembly 30. The outer section 92 can be formed of a non-deformable, non-compressible material such as Teflon and the legs 95 and 96 and 100 can be of a thickness such that they will flex under pressure.

The inner section 93 has a downwardly facing generally horizontally extending surface 102 which abuts the upper surface of the horizontal member 100. Extending generally vertically upward from one edge of the surface 102 is a generally planar side wall 103 which abuts an inner surface of the leg 96. Opposite the side wall 103 is a side wall 104 which tapers inwardly from an edge of the surface 102. The upper edges of the side walls 103 and 104 are connected by three generally planar surfaces 105, 106 and 107. The surface 106 is generally horizontally extending and is connected at opposite edges to the surfaces 105 and 107. The surface 105 extends between adjacent edges of the side wall 103 and the surface 106 and the surface 107 extends between adjacent edges of the side wall 104 and the surface 106. The inner section 93 can be formed of a silicone rubber material.

The cover section 94 is formed of a generally horizontally extending leg 108 and a generally vertically extending leg 109 to form a generally L-shaped body. An inwardly facing surface of the leg 109 is tapered at an angle to match the taper of the side wall 104 of the inner section 93. Thus, the leg 109 functions as a wedge between the leg 95 of the outer section 92 and the side wall 104 of the inner section 93 to force the inner section 93 against the leg 96 of the outer section 92. A thicker section of the leg 108 adjacent the leg 109 has a downwardly facing surface 110 which abuts the planar surface 106 of the inner section 93. A thinner section of the leg 108 has a downwardly facing surface 111 which rests on the upper step 97 of the clamp 91. When the flange 99 abuts the lower step 98, there is a gap 112 formed between the upper surface of the flange 99 and the downwardly facing surface 111. Thus, when the lower mold section 32 and the upper mold section 33 are moved together, the horizontal member 100 is free to flex moving the leg 96 and the flange 99 in a generally vertical direction in the gap 112 to accommodate any variations in the thickness of the window assembly 30.

Figures 8, 9:
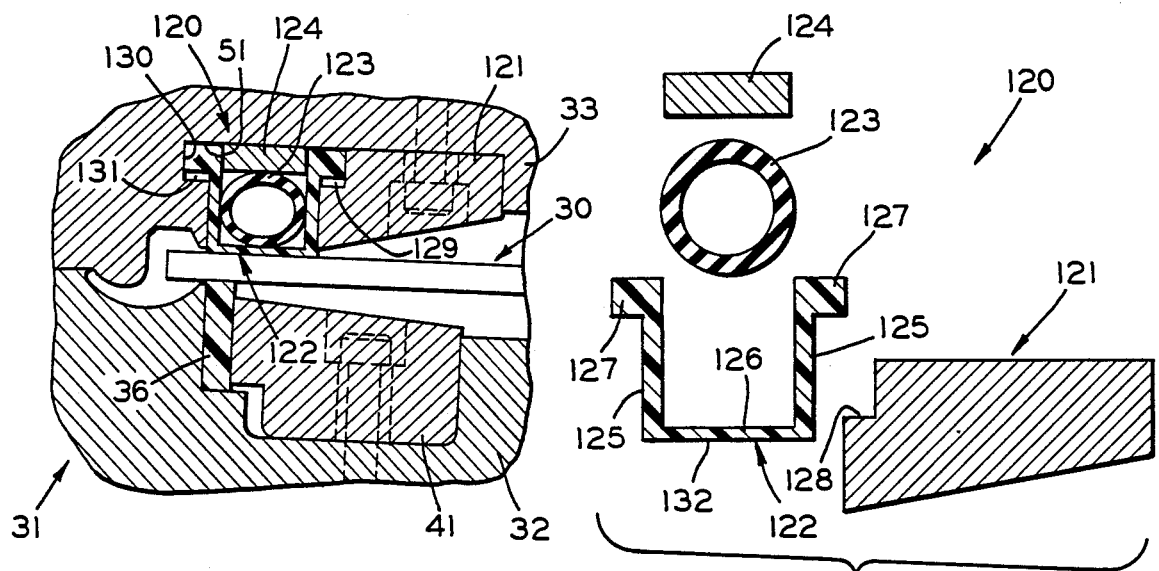
FIG. 8 is a fragmentary sectional view of a third alternate embodiment of the seal assembly shown in FIG. 3.
FIG. 9 is an enlarged, exploded view of the upper seal body shown in FIG. 8.

There is shown in FIG. 8 a third alternate embodiment of the seal assembly in accordance with the present invention. Like reference numerals designate similar elements. An upper seal body 120 is retained in the groove 43 in the upper mold section 33 by a clamp 121. The upper seal body and the clamp 121 are shown in more detail in an exploded, enlarged view FIG. 9. The upper seal body 120 includes an outer section 122 for retaining an inflatable tube 123 and a cover section or cap 124. The outer section 122 is formed of a Teflon material and is generally U-shaped and symmetrical. A pair of generally vertically extending legs 125 are joined at their lower ends by a generally horizontally extending member 126. Each of the legs 125 has an outwardly extending flange 127 formed at its upper end. The clamp 121 has a step 128 formed in the side wall which abuts the outer section 122. The distance between the step 128 and a bottom wall 51 of the groove 43 is greater than the height of the flange 127 such that a gap 129 is formed. The upper mold section 33 is modified by forming a groove 130 in the side wall 50 of the seal retaining groove 43. The width of the groove 130 is greater than the height of the flange 127 such that a gap 131 is formed when one of the flanges 127 is inserted into the groove 130.

The tube 123 is positioned in the outer section 122 and the gap between the upper ends of the legs 125 is closed by the cap 124. The tube 123 is inflated with a fluid such that the outer surface of the tube 123 contacts the inner surfaces of the legs 125, the horizontal member 126 and the cap 124. When the lower mold section 32 and the upper mold section 33 are closed together, a downwardly facing sealing surface 132 of the member 126 contacts the upwardly facing surface of the window assembly 30. The outer section 222 is free to move in a vertical direction thereby deforming the tube 123 to compensate for any variations in the thickness of the window assembly 30. The tube is typically formed of a silicone rubber material.

Figure 10:
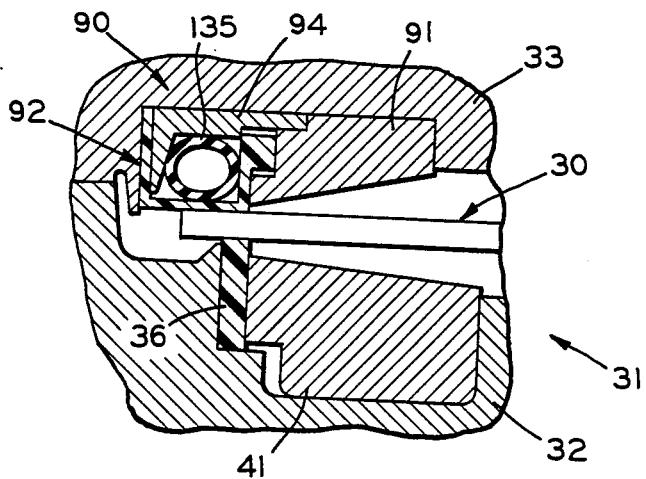
FIG. 10 is a fragmentary sectional view of a fourth alternate embodiment of the seal assembly shown in FIG. 3.

There is shown in FIG. 10 a fourth alternate embodiment of the seal assembly according to the present invention. All of the elements shown in FIG. 10 are similar to like-numbered elements in the seal assembly shown in FIG. 6 with the exception that the inner section 93 of the upper seal body 90 in FIG. 6 has been replaced with an inflatable tube 135 similar to the inflatable tube 123 shown in FIG. 8. Thus, the outer section 92 flexes by deforming the inflated tube 135 to accommodate variations in the thickness of the window assembly 30.

Figure 11:
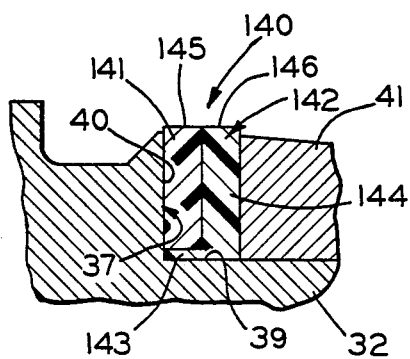
FIG. 11 is a fragmentary sectional view of an alternate embodiment of the lower seal assembly shown in FIG. 3.

FIG. 11 is a sectional view of an alternate embodiment of the lower seal assembly shown in FIG. 3. The lower mold section 32 has the groove 37 formed therein for receiving a lower seal assembly 140. The seal assembly 140 includes a first seal body 141 and a second seal body 142. The groove 37 includes the upwardly facing bottom wall 39 upon which the seal body 142 rests. The seal body 142 is generally L-shaped with a generally horizontally extending leg 143 joined to a generally vertically extending leg 144. The leg 143 abuts the bottom wall 39 and the leg 142 abuts the clamp 41. The groove 37 also has the side wall 40 against which the seal body 141 is retained by the leg 144 and the clamp 41. The seal bodies 141 and 142 provide approximately twice the surface area with sealing surfaces 145 and 146 respectively as the lower seal body 36 with sealing surface 38 in FIG. 3. Thus, the sealing load is distributed over a larger area to reduce the rate of flattening and frequency of replacement of the seal bodies. Typically the seal body 141 is formed of Teflon material and the seal body 142 is formed of a urethane material having a ninety durometer hardness.

Typically, the upper and lower seals extend around those portions of the window periphery to which the gasket is to be molded. If the gasket is to be formed around the entire periphery of the window assembly, the upper and lower seals in the mold will be formed as rings. Where the seal assembly includes an inflatable tube, a relatively non-compressible liquid such as oil could be utilized to fill the tube. If a compressible gas is utilized instead, a pressure fluid source at a relatively higher pressure could be utilized and include a pressure regulator which could be set to provide the desired pressure to the tube. Should the molds and seals have a tendency to pose too high a pressure on the tubes, a compensator can be provided.

In accordance with the provisions of the patent statutes, the principle and mode of operation of the present invention have been described in what has been considered to represent the preferred embodiment. However, it should be understood that the invention may be practiced otherwise than as specifically illustrated and described without departing from the scope of the attached claims.

What is claimed is:

1. A seal assembly for a mold for encapsulating a window assembly, comprising:
    a first seal element formed of a non-deformable, non-compressible material and having a first surface adapted to sealingly contact a window assembly and a second surface; and
    a second seal element formed of a deformable, non-compressible material and having a first surface abutting said second surface of said first seal element and responsive to pressure applied to said first seal element for adjusting the position of said first seal element in a mold to accommodate thickness variations in a window assembly contacting said first surface, said first seal element being generally L-shaped with said first surface thereof being an outer surface of one of its legs and said second surface being an inner surface of the other one of its legs.

2. The seal assembly according to claim 1, including clamp means for retaining said first seal element and said second seal element in a groove formed in a mold.

3. A mold structure for forming a gasket on a predetermined portion of a frangible sheet, comprising:
    at least two cooperating mold sections having facing surfaces defining a chamber for receiving the sheet;
    a seal assembly positioned in at least one of the facing surfaces of said mold sections to assist in supporting the sheet within the sheet receiving chamber and to cooperate with the predetermined portion of the sheet to at least in part define a gasket forming cavity corresponding to the gasket to be formed on the sheet;
    said seal assembly including a first seal element formed of a non-deformable, non-compressible material and having a first surface adapted to sealingly contact a window assembly and a second surface;
    a second seal element formed of a deformable, non-compressible material and having a first surface abutting said second surface of said first seal element and responsive to pressure applied to said first seal element for adjusting the position of said first seal element in said at least one of the facing surfaces of the mold sections to accommodate thickness variations in the window assembly contacting said first surface of the first seal element, said first seal element being generally L-shaped with said first surface thereof being an outer surface of one of its legs and said second surface being an inner surface of the other one of its legs; and
    inlet means for introducing a flowable gasket material into the gasket forming cavity.

4. A mold structure according to claim 3, wherein the first seal element has a Durometer hardness of about 90.

5. A mold structure according to claim 3, wherein the second seal element has a Durometer hardness of about 70.

6. A mold structure according to claim 3, wherein the first seal element is formed of a polytetrafluoroethylene material.

7. A mold structure according to claim 3, wherein the second seal element is formed of a silicone rubber material.

8. A mold structure according to claim 3, wherein said first seal element is formed of a polytetrafluoroethylene material having a Durometer hardness of about 90, and said second seal element is formed of a silicone rubber material and has a Durometer hardness of about 70.

9. A mold structure according to claim 3, including clamp means for retaining said seal assembly in a groove formed in said at least one of the facing surfaces of the mold sections.

10. A mold structure according to claim 8, including clamp means for retaining said seal assembly in a groove formed in said at least one of the facing surfaces of the mold sections.

* * * * *